(12) United States Patent
Chang (10) Patent No.: US 6,874,718 B1
(45) Date of Patent: Apr. 5, 2005

(54) FISHING SPINNING REEL

(75) Inventor: Liang-Jen Chang, No. 23, Lane 184-15, Hsin-Ping Rd., Tai-Ping City, Taichung Hsien (TW)

(73) Assignee: Liang-Jen Chang, Tai-Ping (TW)

( * ) Notice: Subject to any disclaimer, the term of this patent is extended or adjusted under 35 U.S.C. 154(b) by 0 days.

(21) Appl. No.: 10/663,921

(22) Filed: Sep. 16, 2003

(51) Int. Cl.[7] .............................................. A01K 89/02
(52) U.S. Cl. ...................................... 242/246; 242/321
(58) Field of Search ............................ 242/244, 246, 242/321

(56) References Cited

U.S. PATENT DOCUMENTS

| | | | | | |
|---|---|---|---|---|---|
| 4,549,702 | A | * | 10/1985 | Councilman | ................ 242/246 |
| 5,149,008 | A | * | 9/1992 | Oi | ................ 242/246 |
| 5,947,400 | A | * | 9/1999 | Tsutsumi | ................ 242/322 |
| 6,598,819 | B2 | * | 7/2003 | Furomoto | ................ 242/319 |
| 6,641,069 | B2 | * | 11/2003 | Katayama et al. | ........... 242/246 |
| 2002/0170997 | A1 | * | 11/2002 | Furomoto | ................ 242/246 |

FOREIGN PATENT DOCUMENTS

| GB | 2123661 | * | 2/1984 | ................ 242/244 |
|---|---|---|---|---|

* cited by examiner

*Primary Examiner*—Emmanuel Marcelo
(74) *Attorney, Agent, or Firm*—Brinks Hofer Gilson & Lione (57) ABSTRACT

A fishing spinning reel includes a spool member surrounding rotatably a spindle for reeling a fishing line, and having front and rear friction walls. Front and rear friction members are mounted on the spindle and respectively have abutment areas to confront and to be brought into frictional engagement with the front and rear friction walls. A friction force adjusting member is retainingly movable relative to the spindle so as to be operated between depressing and releasing positions to hold the abutment area of the rear friction member in first and second frictional engagements of greater and smaller frictional forces with the rear friction wall, respectively.

5 Claims, 7 Drawing Sheets

FISHING SPINNING REEL

BACKGROUND OF THE INVENTION

1. Field of the Invention

This invention relates to a fishing spinning reel, more particularly to a fishing spinning reel with a spool braking mechanism which includes front and rear friction members to be in frictional engagement with a spool member thereof.

2. Description of the Related Art

Figure 1:
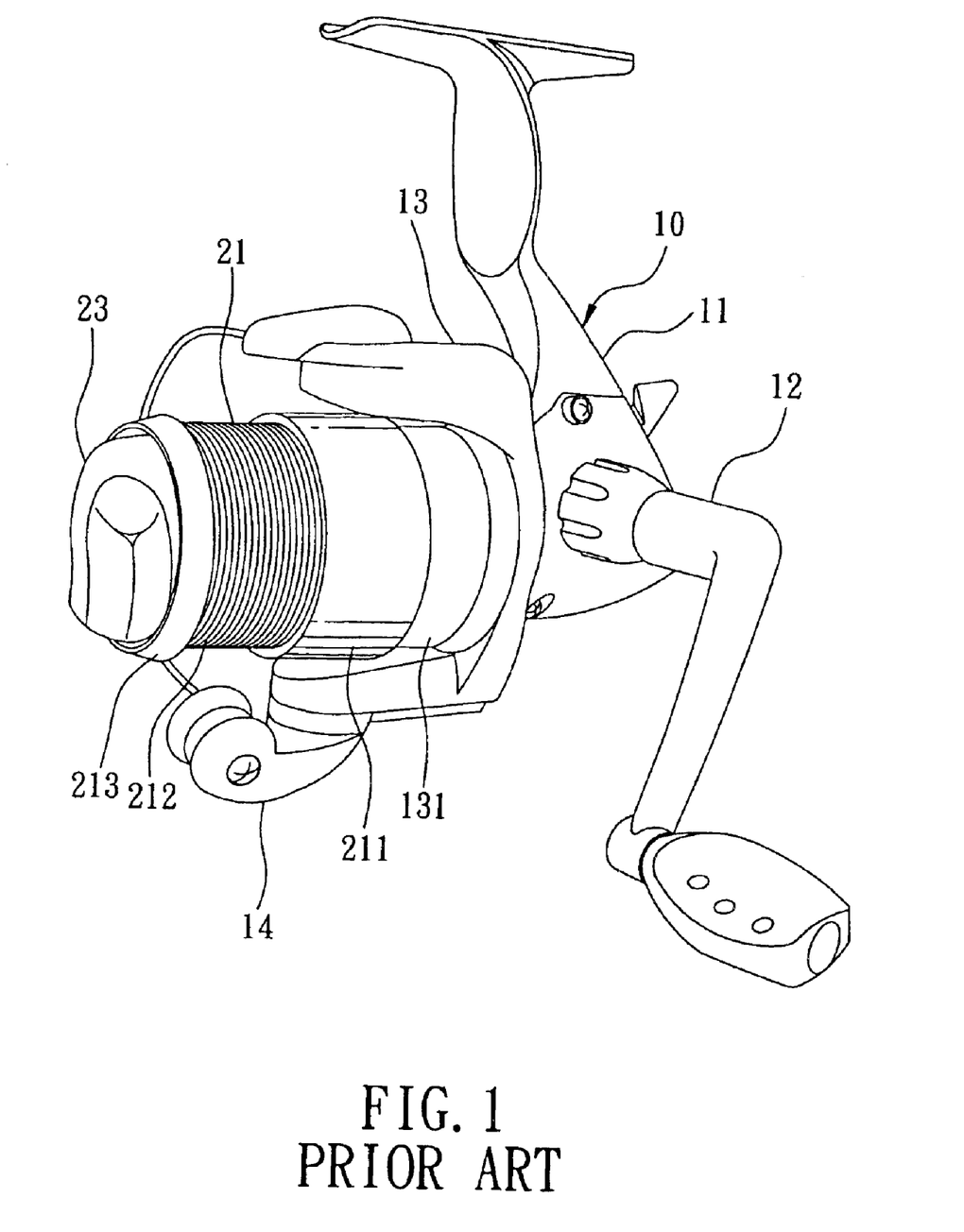
FIG. 1 is a perspective view of a conventional fishing spinning reel.
Figure 2:
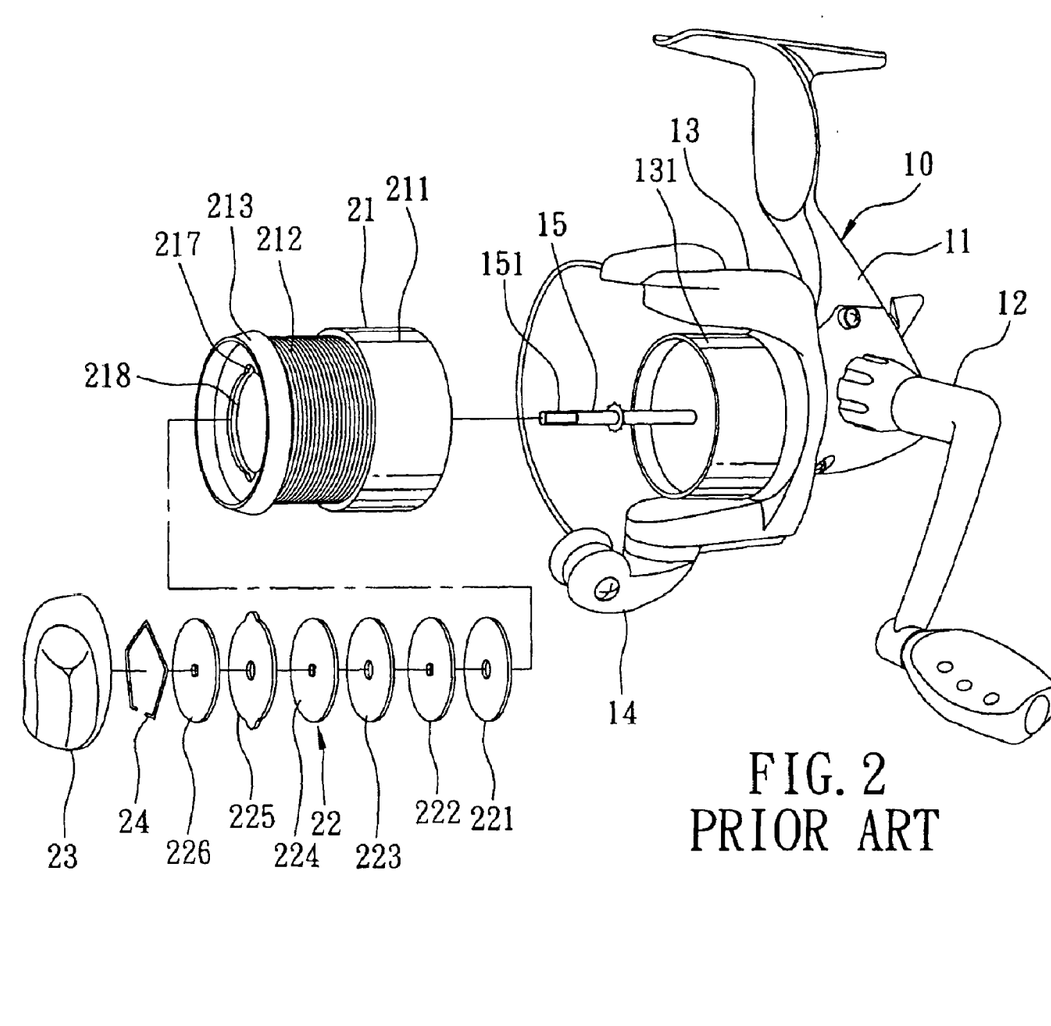
FIG. 2 is a fragmentary exploded perspective view of the conventional fishing spinning reel showing a spool braking mechanism thereof.
Figure 3:
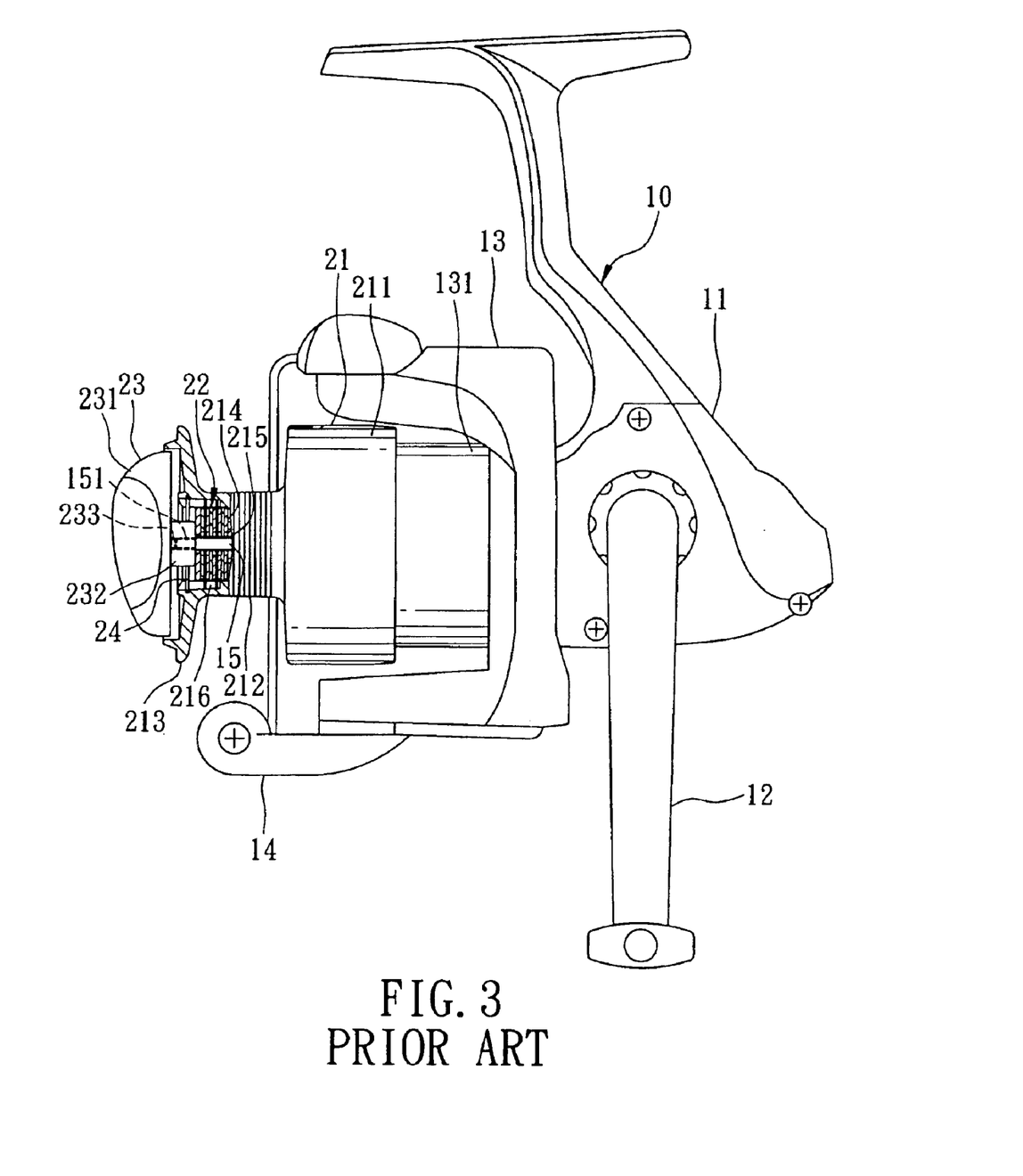
FIG. 3 is a partly sectioned schematic view of the conventional fishing spinning reel.
Figure 4:
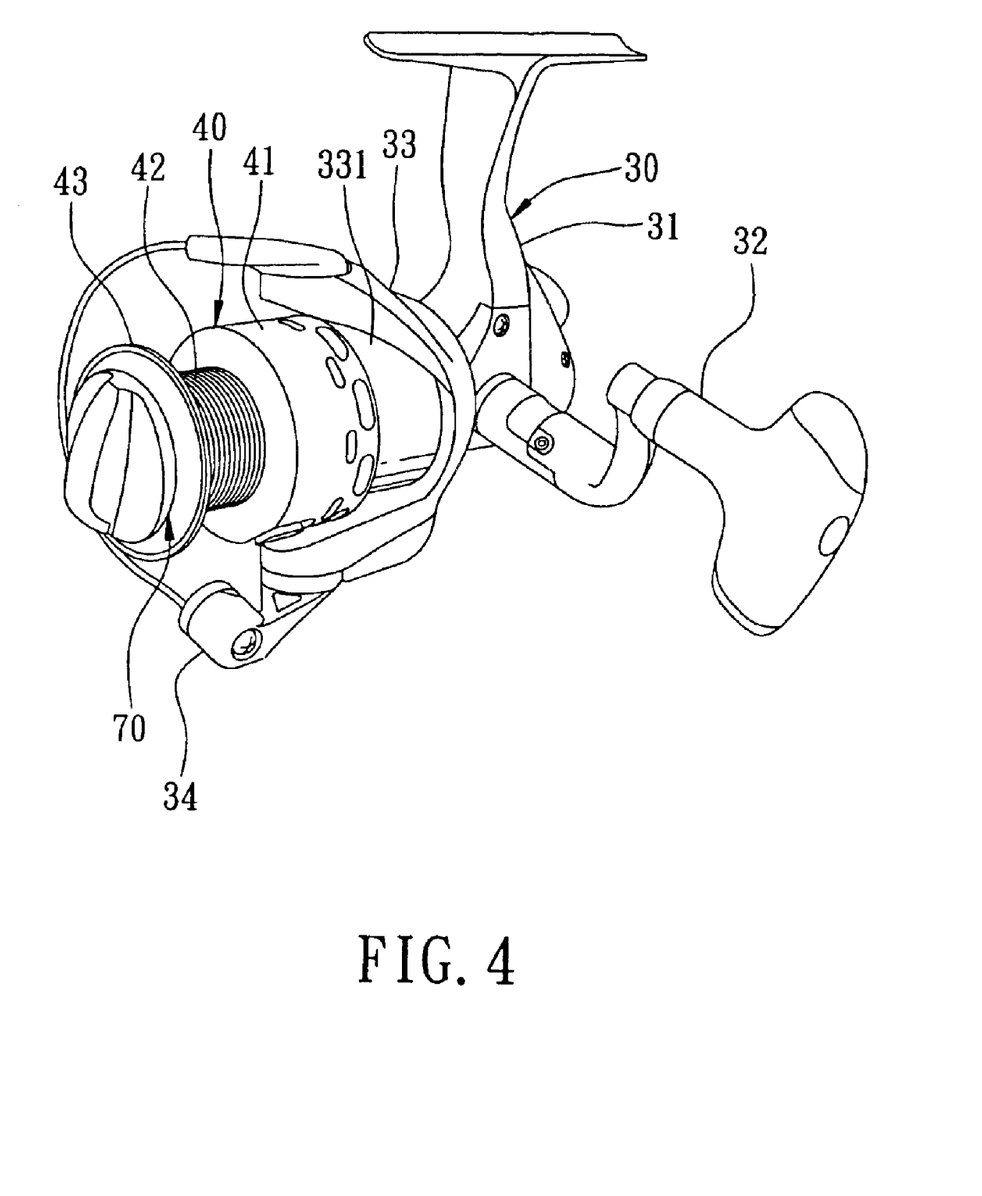
FIG. 4 is a fragmentary perspective view of the preferred embodiment of a fishing spinning reel according to this invention.

Referring to FIGS. 1 to 3, a conventional fishing spinning reel 10 is shown to include a reel frame 11 secured on a fishing rod (not shown), a cranking handle 12 mounted on and rotatable relative to the reel frame 11 for reeling in a fishing line, a reciprocating spool spindle 15 disposed to be movable relative to the reel frame 11 by rotation of the cranking handle 12, a rotary member 13 with a socket 131 surrounding and rotatable relative to the spindle 15 to reel in the fishing line, a bail member 14 attached to the rotary member 13, a spool member 21, a spool braking member 22, and an adjusting member 23.

The spool member 21 includes rear and front spool portions 211, 213 and a smaller-diameter intermediate spool portion 212 therebetween for winding the fishing line. The intermediate spool portion 212 has a friction wall 214 extending radially and inwardly from an inner surrounding wall surface thereof, and having a bushing 215 sleeved on the spindle 15 so as to cooperate with the inner surrounding wall surface to confine an accommodation chamber 216. Moreover, two key slots 217 and an annular groove 218 are formed in the inner surrounding wall surface.

The spool braking member 22 includes first and second brake disks 221, 222, a first drag washer 223, a third brake disk 224, a second drag washer 225, and a third drag washer 226 which are received in the chamber 216 in sequence. The second drag washer 225 has two key projections to engage the key slots 217, respectively. A retaining ring 24 is received in the annular groove 218

The adjusting member 23 includes a tubular stem 232 which has an internally threaded surface 233 engaging threadedly an externally threaded surface 151 of the spindle 15, and a knob 231 which is disposed outwardly of the spool member 21 to be operated externally so as to rotate the tubular stem 232.

In a reeling-in stage, the knob 231 is operated to screw-in the spindle 15 such that the tubular stem 232 forces the spool braking member 22 to be in greater frictional engagement with the friction wall 214 so as to prevent rotation of the spool member 21 relative to the spindle 15. In a reeling-out stage, the tubular stem 232 is screwed out of the spindle 15 to permit withdrawal of the spool braking member 22 from the friction wall 214 to permit rotation of the spool member 21. Thus, the friction force is adjustable by operation of the knob 231.

However, the friction force is only applied to one side (i.e. the friction wall 214) of the spool member 21, thereby resulting in a relatively small braking area and in an inferior braking effect. In addition, the spool braking member 22 includes a large number of brake disks and drag washers, thereby resulting in higher total weight and manufacturing costs. Moreover, since the thickness of the friction wall 214 and the length of the bushing 215 are limited due to the weight requirement, the spool member 21 tends to be rotated unsteadily in the reeling-out stage, thereby resulting in wearing of the spool member 21 and breaking of the fishing line. Furthermore, the spool member 21 is exposed to moisture and dust from the other side thereof relative to the knob 231.

SUMMARY OF THE INVENTION

Therefore, the object of the present invention is to provide a fishing spinning reel which includes a friction force adjustable spool braking mechanism to achieve a better braking effect on a spool member, to permit stable rotation of the spool member, and to reduce total weight and manufacturing costs thereof.

According to this invention, the fishing spinning reel includes a reel frame adapted to be mounted on a fishing rod. A cranking handle is mounted on and is rotatable relative to the reel frame about a rotating axis for reeling in a to the rotating axis, and is movable relative to the reel frame along the spindle axis. The reciprocating spool spindle includes proximate and distal portions opposite to each other along the spindle axis, and an intermediate portion which is interposed between the proximate and distal portions, and which includes front and rear segments respectively proximate to the distal and proximate portions. A rotary member is mounted to surround and to be rotatable relative to the proximate portion about the spindle axis, and is coupled relative to the cranking handle so as to rotate for reeling in the fishing line. A spool member includes an outer surrounding wall surface adapted to be wound by the fishing line in a reeling-in stage, and an inner surrounding wall surface which is opposite to the outer surrounding wall surface in radial directions relative to the spindle axis, and which is disposed to surround and to be rotatable relative to the intermediate portion in a reeling-out stage about the spindle axis.

The spool member further includes front and rear friction walls which are opposite to each other along the spindle axis, and which extend from the inner surrounding wall surface radially relative to the spindle axis.

A rear friction member is mounted on the rear segment, and has a first abutment area confronting and brought into first and second frictional engagements with the rear friction wall, which are respectively of a greater frictional force in the reeling-in stage and of a smaller frictional force in the reeling-out stage.

A front friction member is mounted on and is movable relative to the front segment along the spindle axis, and has a second abutment area disposed to confront and to be moved towards the front friction wall to bring the first abutment area into the first and second frictional engagements with the rear friction wall, thereby preventing the spool member from rotation relative to the intermediate portion in the reeling-in stage, and thereby permitting withdrawal of the second abutment area from the front friction wall so as to bring the first abutment area to the reeling-out stage, respectively.

A friction force adjusting member is retainingly movable relative to the distal portion between depressing and releasing positions, where the friction force adjusting member holds the first abutment area in the first and second frictional engagements with the rear friction wall, respectively.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENTS

Referring to FIGS. 4 to 7, the preferred embodiment of a fishing spinning reel 30 according to the present invention is shown to comprise a reel frame 31 adapted to be mounted on a fishing rod (not shown) in a known manner, a cranking handle 32 mounted on and rotatable relative to the reel frame 31 about a rotating axis for reeling in a fishing line (not shown), a reciprocating spool spindle 35 extending along a spindle axis transverse to the rotating axis, and disposed to be movable relative to the reel frame 31 along the spindle axis, a rotary member 33, a bail member 34, a spool member 40, and a spool braking mechanism.

The reciprocating spool spindle 35 includes proximate and distal portions 351, 353 opposite to each other along the spindle axis, and an intermediate portion 352 which is interposed between the proximate and distal portions 351, 353, and which includes front and rear segments 3521,3522 respectively proximate to the distal and proximate portions 353, 351. A barrier plate 36 is secured on and extends radially and outwardly from the rear segment 3522. The distal portion 353 is formed with an externally threaded surface 3531.

The rotary member 33 has a socket 331 which is mounted to surround and to be rotatable relative to the proximate portion 351 of the spindle 35 about the spindle axis, and which is coupled relative to the cranking handle 32 so as to rotate for reeling in the fishing line.

The bail member 34 is attached to the rotary member 33 in a known manner so as to rotate with the rotary member 33 for winding the fishing line on the spool member 40.

The spool member 40 includes a rear spool portion 41 which is sleeved on the socket 331 of the rotary member 33 and which has a larger outer diameter, an intermediate spool portion 42 which extends from the rear spool portion 41 forwardly and which has an outer surrounding wall surface 423 with a smaller outer diameter so as to be adapted to be wound by the fishing line in a reeling-in stage, and a front spool portion 43 which extends from the intermediate spool portion 42 forwardly and which has a larger outer diameter. The intermediate spool portion 42 further has an inner surrounding wall surface 424 which is opposite to the outer surrounding wall surface 423 in radial directions relative to the spindle axis, and which is disposed to surround and to be rotatable relative to the intermediate portion 352 of the spindle 35 in a reeling-out stage about the spindle axis.

Figure 5:
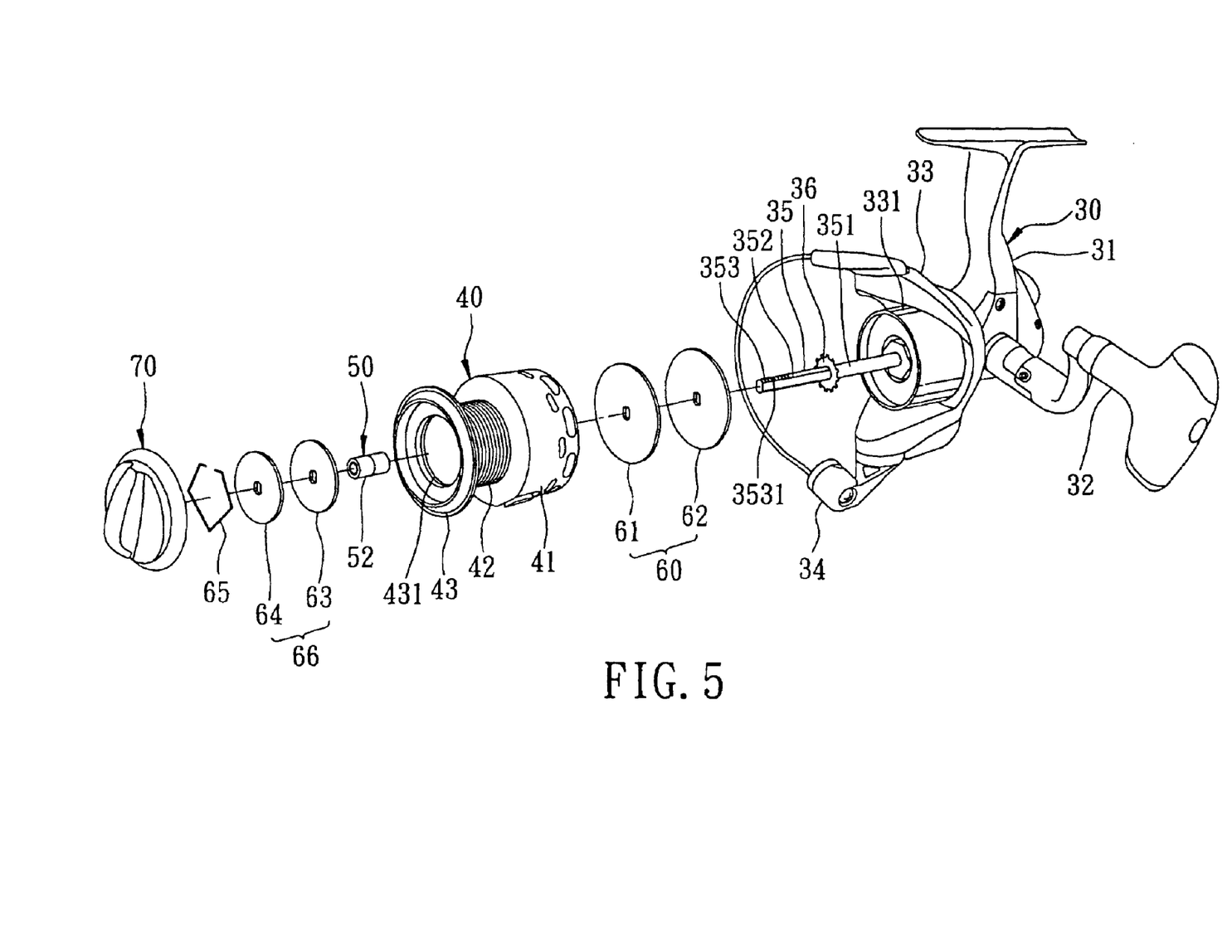
FIG. 5 is a fragmentary exploded perspective view of the preferred embodiment.
Figure 6:
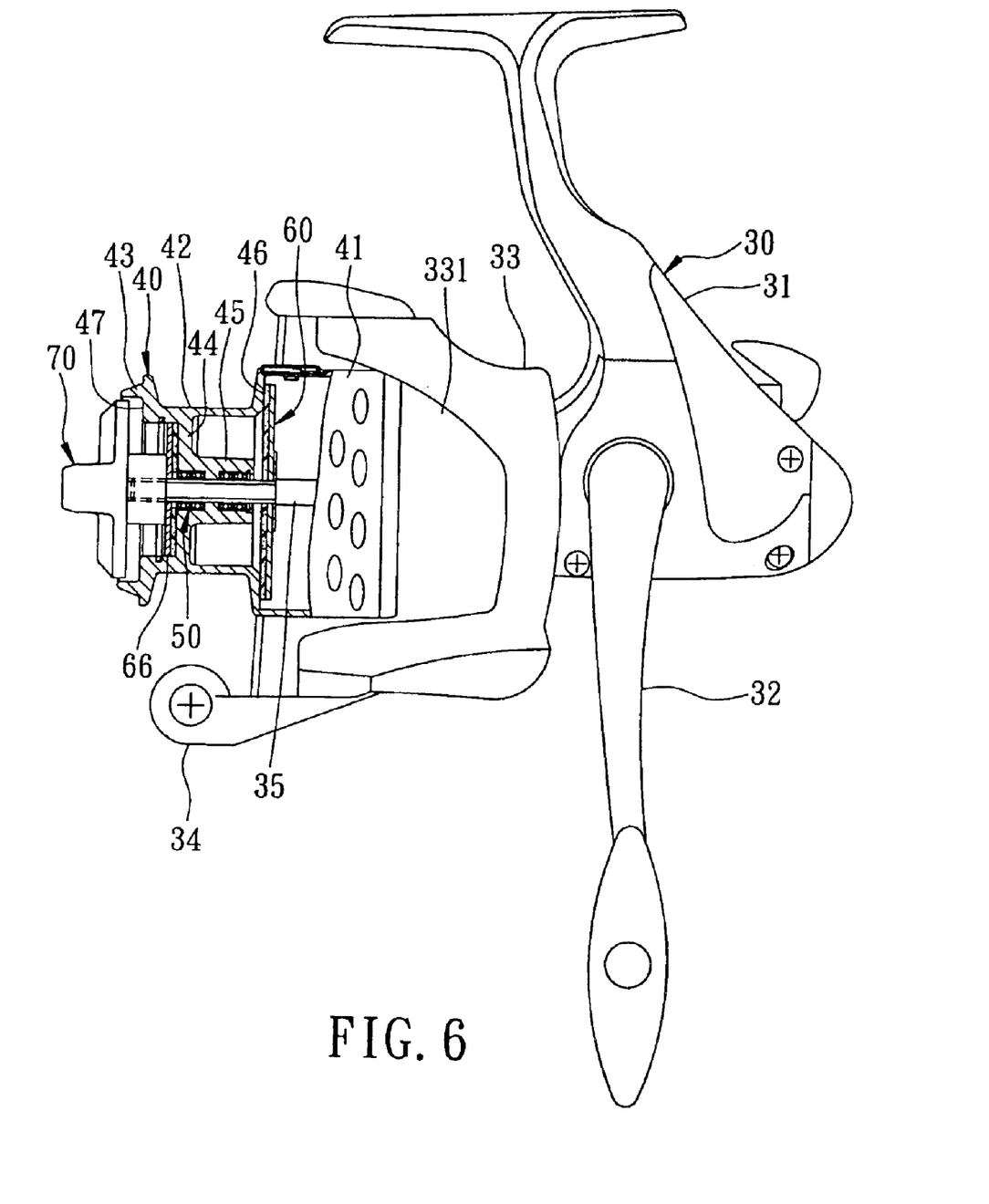
FIG. 6 is a partly sectioned schematic view of the preferred embodiment.
Figure 7:
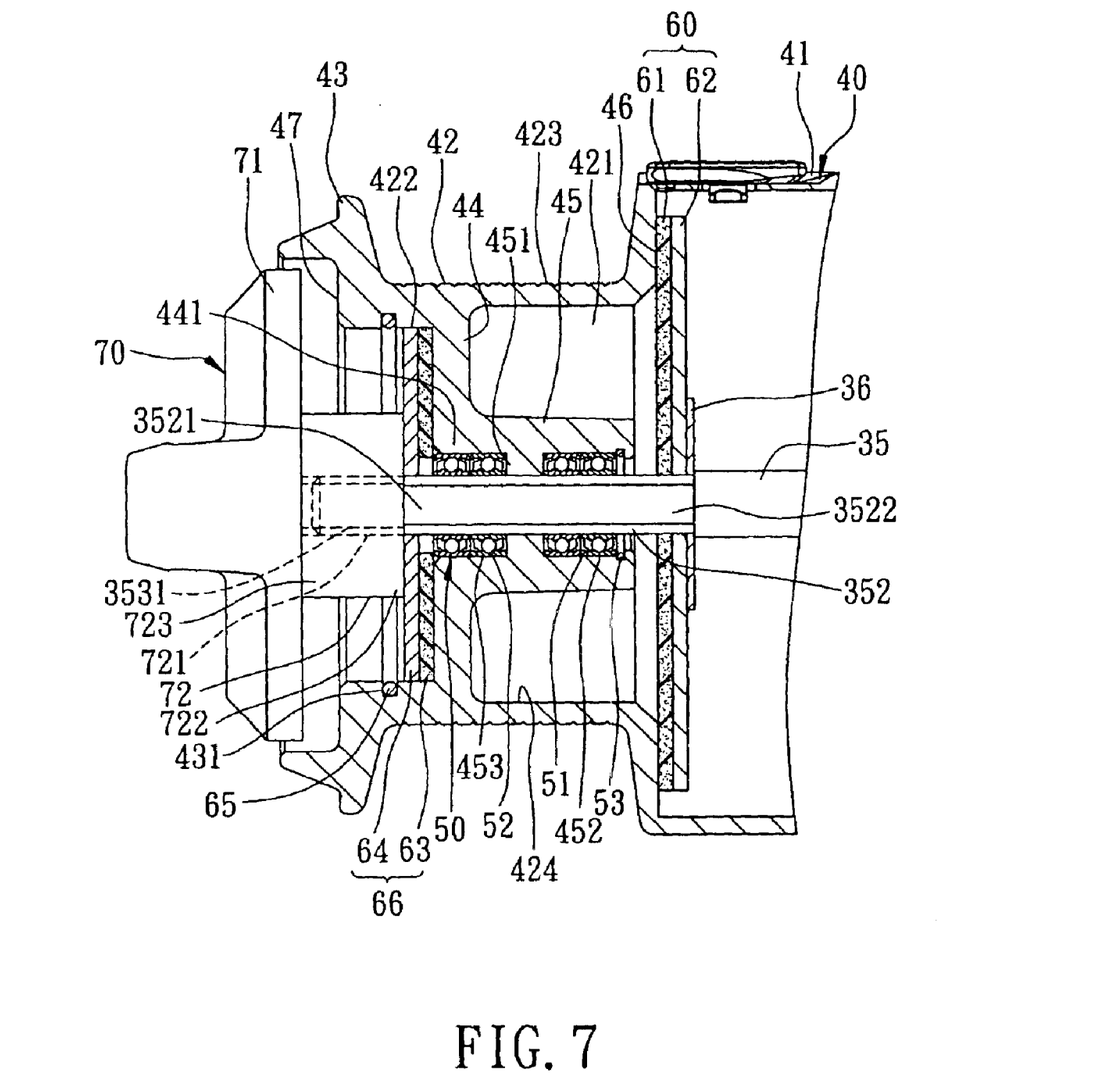
FIG. 7 is a fragmentary sectional view of the preferred embodiment.

The spool member 40 further includes a front friction wall 44 which extends from the inner surrounding wall surface inwardly and in radial directions relative to the spindle axis to terminate at an inner peripheral wall 441 that surrounds the spindle axis, and a central tubular wall 45 which extends from the inner peripheral wall 441 rearwardly and which surrounds the intermediate portion 352 of the spindle 35. By virtue of the front friction wall 44, front and rear accommodation chambers 422, 421 are formed within the intermediate spool portion 42. Thus, the central tubular wall 45 is formed in the rear accommodation chamber 421. Further, a surrounding partition wall 451 extends from the central tubular wall 45 in the radial directions so as to cooperate with the intermediate portion 352 and the central tubular wall 45 to confine front and rear surrounding bearing chambers 453, 452.

The spool member 40 further includes a rear friction wall 46 which is opposite to the front friction wall 44 along the spindle axis, and which extends from the inner surrounding wall surface 424 outwardly and in the radial directions to engage the rear spool portion 41, and a shoulder portion 47 which is formed at the juncture between the inner surrounding wall surface 424 and the front spool portion 43.

The spool braking mechanism includes a rear friction member 60, a front friction member 66, an anti-friction member 50, and a friction force adjusting member 70.

The rear friction member 60 is mounted on the rear segment 3522 of the spindle 35, and includes a flexible plate 61 which is formed of a composite material, such as Teflon®, graphite, cork and the like, having heat-resistant and wear-resistant characteristics and capable of providing good frictional force, and a rigid plate 62 which is formed of a metal material. The flexible plate 61 has a first abutment area which is disposed to abut against and to be brought into first and second frictional engagements with the rear friction wall 46, that are respectively of a greater frictional force in the reeling-in stage and of a smaller frictional force in the reeling-out stage. The rigid plate 62 is sandwiched between the flexible plate 61 and the barrier plate 36.

The front friction member 66 is mounted on and is movable relative to the front segment 3521 of the spindle 35 along the spindle axis. The front friction member 66 is received in the front accommodation chamber 422, and includes a flexible plate 63 and a rigid plate 64 which are formed of the same materials as those of the flexible plate 61 and the rigid plate 62, respectively. A retaining ring 65 is received in an annular groove 431 formed in the inner surrounding wall surface 424 so as to prevent removal of the front friction member 66 from the front accommodation chamber 422.

The anti-friction member 50 includes front and rear bearings 52, 51 which are disposed in the front and rear surrounding bearing chambers 453, 452, respectively, so as to facilitate rotation of the spool member 40 relative to the intermediate portion 352 of the spindle 35 in the reeling-out stage. A retaining ring 53 is received in the inner surrounding wall surface 424 so as to prevent removal of the rear bearing 52 from the rear surrounding bearing chamber 452. In this embodiment, each of the front and rear bearings 52, 51 includes two ball bearings. Alternatively, the anti-friction member 50 can be formed as a bushing.

The friction force adjusting member 70 includes a tubular stem 72 and an operating knob 71. The tubular stem 72 has a depressing end 722 which is disposed to abut against the rigid plate 64 of the front friction member 66 such that the flexible plate 63 has a second abutment area confronting and movable towards the front friction wall 44. The tubular stem 72 further has a connecting end 723 which is disposed opposite to the depressing end 722 along the spindle axis, and an internally threaded surface 721 which extends from the depressing end 722 toward the connecting end 723 along the spindle axis and which engages threadedly the externally threaded surface 3531 of the distal portion 353 of the spindle 35. The operating knob 71 is connected to the connecting end 723 of the tubular stem 72, and extends outwardly of the front spool portion 43 of the spool member 40. As such, when the operating knob 71 is operated externally to rotate the tubular stem 72 relative to the distal portion 353 to a depressing position, where the externally threaded surface 3531 of the distal portion 353 is screwed-in the internally threaded surface 721, the barrier plate 36 is moved toward the front friction wall 44 so as to bring the first abutment surface of the flexible plate 61 into the first frictional engagement with the rear friction wall 46. That is, the front and rear friction members 66,60 can clamp firmly the front and rear friction walls 44, 46 to prevent the spool member 40 from rotation relative to the intermediate portion 352 of the spindle 35 in the reeling-in stage. On the contrary, when the tubular stem 72 is rotated to a releasing position, where the externally threaded surface 3531 of the distal portion 353 is screwed-out of the internally threaded surface 721, the barrier plate 36 is moved away from the front friction wall 44 so as to bring the first abutment surface of the flexible plate 61 into the second frictional engagement with the rear friction wall 46. In this state, the second abutment area of the flexible plate 63 can be withdrawn from the front friction wall 44 so as to bring the first abutment area of the flexible plate 61 to the reeling-out stage.

Since the front and rear-friction members 66, 60 can be in frictional engagement simultaneously with the front and rear friction walls 44, 46 when the friction force adjusting member 70 is operated to the depressing position, and since the rear friction member 60 has the first abutment area of a relative large dimension, a great braking effect can be obtained. In addition, the spool braking mechanism of this invention includes two of the flexible plates 61,63, which are fewer than the components of the conventional fishing spinning reel, thereby resulting in reduction in total weight and manufacturing costs.

Further, with the provision of the anti-friction member 50 and the central tubular wall 45, the spool member 40 can rotate steadily in the reeling-out stage, thereby preventing wearing of the spool member 40. Moreover, since the front and rear friction members 66, 60 are provided on two sides of the anti-friction member 50, waterproof and dustproof effects for the anti-friction member 50 and the spool member 40 can be achieved.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:
1. A fishing spinning reel comprising:
    a reel frame adapted to be mounted on a fishing rod;
    a cranking handle mounted on and rotatable relative to said reel frame about a rotating axis for reeling in a fishing line;
    a reciprocating spool spindle extending along a spindle axis transverse to the rotating axis, and disposed to be movable relative to said reel frame along the spindle axis, said reciprocating spool spindle including proximate and distal portions opposite to each other along the spindle axis, and an intermediate portion which is interposed between said proximate and distal portions, and which includes front and rear segments respectively proximate to said distal and proximate portions, said reciprocating spool spindle including a barrier plate which extends-radially and outwardly from said rear segment;
    a rotary member which is mounted to surround and which is rotatable relative to said proximate portion about the spindle axis, and which is coupled relative to said cranking handle so as to rotate for reeling in the fishing line;
    a spool member including an outer surrounding wall surface adapted to be wound by the fishing line in a reeling-in stage and an inner surrounding wall surface which is opposite to said outer surrounding wall surface in radial directions relative to the spindle axis, and which is disposed to surround and to be rotatable relative to said intermediate portion in a reeling-out stage about the spindle axis, said spool member further including front and rear friction walls which are opposite to each other along the spindle axis, and which extend from said inner surrounding wall surface radially relative to the spindle axis, wherein said front and rear friction walls extend from said inner surrounding wall surface in radial directions, and respectively extend inwardly and outwardly, said front friction wall terminating at an inner peripheral wall which surrounds said spindle axis, said spool member further including a central tubular wall which extends from said inner peripheral wall rearwardly and which surrounds said intermediate portion;
    a rear friction member mounted on said rear segment and having a first abutment area disposed to confront and to be brought into first and second frictional engagements with said rear friction wall, which are respectively of a greater frictional force in the reeling-in stage and of a smaller fictional force in the reeling-out stage:
    a front friction member mounted on and movable relative to said front segment along the spindle axis, and having a second abutment area which is disposed to confront and to be moved towards said front friction wall to bring said first abutment area into the first and second frictional engagements with said rear friction wall, thereby preventing said spool member from rotation relative to said intermediate portion in the reeling-in stage, and thereby permitting withdrawal of said second abutment area from said front friction wall so as to bring said first abutment area to the reeling-out stage, respectively, said rear friction member including a flexible plate having said first abutment area to abut against said rear friction wall, and a rigid plate which is sandwiched between said flexible plate and said barrier plate such that said barrier plate is moved toward said front friction wall when said friction force adjusting member is moved from the releasing position to the depressing position so as to bring said first abutment area into the first frictional engagement with said rear friction wall; and
    a friction force adjusting member retainingly movable relative to said distal portion between depressing and releasing positions where said friction force adjusting member holds said first abutment area in the first and second frictional engagements with said rear friction wall, respectively.

2. The fishing spinning reel of claim 1, further comprising an anti-friction member which is disposed between said central tubular wall and said intermediate portion so as to facilitate rotation of said spool member relative to said intermediate portion in the reeling-out stage.

3. The fishing spinning reel of claim 2, wherein said spool member further includes a surrounding partition wall extending from said central tubular wall in the radial directions so as to cooperate with said intermediate portion and said central tubular wall to confine front and rear surrounding bearing chambers, said anti-friction member including front and rear bearings which are disposed in said front and rear surrounding bearing chambers, respectively.

4. The fishing spinning reel of claim 1, wherein said distal portion is formed with an externally threaded surface, said friction force adjusting member including a tubular stem which has a depressing end that abuts against said front friction member, a connecting end opposite to said depressing end along the spindle axis, and an internally threaded surface that extends from said depressing end toward said connecting end along the spindle axis and that engages threadedly said externally threaded surface, and an operating knob which is connected to said connecting end, and which extends outwardly of said spool member so as to be externally operable to rotate said tubular stem relative to said distal portion to permit said externally threaded surface to screw-in and screw-out said internally threaded surface to the depressing and releasing positions, respectively, thereby moving said barrier plate relative to said front friction wall.

5. The fishing spinning reel of claim 4, wherein said front friction member includes a flexible plate having said second abutment area, and a rigid plate which is sandwiched between said flexible plate and said depressing end.

* * * * *